United States Patent [19]

Allen

[11] Patent Number: 4,815,230

[45] Date of Patent: Mar. 28, 1989

[54] CRICKET DISPENSER

[76] Inventor: Donavan J. Allen, 91 Randall Dr., Taylors, S.C. 29687

[21] Appl. No.: 157,054

[22] Filed: Feb. 16, 1988

[51] Int. Cl.⁴ .......................................... A01K 97/04
[52] U.S. Cl. ...................................................... 43/55
[58] Field of Search ............................................ 43/55

[56] References Cited

U.S. PATENT DOCUMENTS

| | | | |
|---|---|---|---|
| 2,857,705 | 10/1958 | Woodcock | 43/55 |
| 3,308,570 | 3/1967 | Horton | 43/55 |
| 4,047,320 | 9/1977 | Lee | 43/55 |
| 4,110,931 | 9/1978 | Maness | 43/55 |
| 4,158,267 | 6/1979 | Farnsworth | 43/55 |
| 4,207,993 | 6/1980 | Ellis et al. | 43/55 |

*Primary Examiner*—M. Jordan
*Attorney, Agent, or Firm*—Bailey & Hardaway

[57] ABSTRACT

A cricket dispensing nozzle having a generally annular open end for communicating with the source of crickets. Four (4) resilient prongs emerge from the annular member and converge towards a dispensing opening in a continuous manner. Spaces between the four prongs permit insertion of a hook, both through that space and through the space below so that the hook may be passed through the cricket twice and the cricket removed from the nozzle without otherwise damaging the cricket.

3 Claims, 1 Drawing Sheet

CRICKET DISPENSER

BACKGROUND OF THE INVENTION

This invention relates generally to the art of fishing and, more particularly, to a cricket dispensing nozzle.

Various appliances have been devised for the fisherman so as to permit and facilitate the placement of live bait, particularly crickets, onto a fishing hook. Very frequently with the best of these systems the crickets are often damaged and are marred and, thus, presents less than a perfect bait to the fish to be attracted thereby.

Various prior art devices are described in the following U.S. Patents:
1. U.S. Pat. No. 731,335 invented by Nicholas Blanchet;
2. U.S. Pat. No. 2,787,080 invented by John W. Wells;
3. U.S. Pat. No. 2,833,080 invented by Clem H. Hess and Raymond C. Hess;
4. U.S. Pat. No. 2,857,705 invented by John Woodcock;
5. U.S. Pat. No. 2,883,788 invented by Elmer E. Stitt, deceased, by Olive M. Stitt, administratrix;
6. U.S. Pat. No. 3,308,570 invented by Eddie Horton;
7. U.S. Pat. No. 4,047,320 invented by Marion D. Lee; and
8. U.S. Pat. No. 4,207,993 invented by Doyce F. Ellis, Sr., deceased, by Ira N. J. Ellis, administrator.

While these prior art devices ease the plight of the fisherman, substantial room exists for improvement in such devices.

SUMMARY OF THE INVENTION

It is thus an object of this invention to provide a novel cricket dispenser.

It is further an object of this invention to provide such a dispenser which has a novel nozzle.

It is yet a further and more particular object of this invention to provide a dispensing nozzle which permits entrapment of a cricket while permitting impalement of the cricket on a hook device for removal from the nozzle without otherwise damaging the cricket.

It is a further and yet more particular object of this invention to provide a novel dispensing apparatus which permits dispensing with the use of only one hand which does not contact the cricket.

These, as well as other objects, are accomplished by cricket dispensing nozzle having a generally annular open end for communicating with the source of crickets. Four (4) resilient prongs emerge from the annular member and converge towards a dispensing opening in a continuous manner. Spaces between the prongs permit insertion of a hook, both through that space and through the space below so that the hook may be passed through the cricket for impalement in a variety of positions.

DETAILED DESCRIPTION OF THE DRAWINGS

In accordance with this invention, it has been found that a novel cricket dispensing apparatus may be utilized to dispense crickets without the need for manual handling. It also has been found that the apparatus of this invention may permit impalement of a cricket and removal from a dispensing nozzle with the use of only one hand and without otherwise damaging the cricket.

It has been further found that a nozzle configuration can be formed which permits cricket entry and entrapment without movement of the nozzle to create such entrapment. All of this occurs in such a way as to make the cricket readily visible for impalement on a hook.

Various other advantages and features will become apparent from a reading of the following description given with reference to the various figures of drawings.

Figure 1:
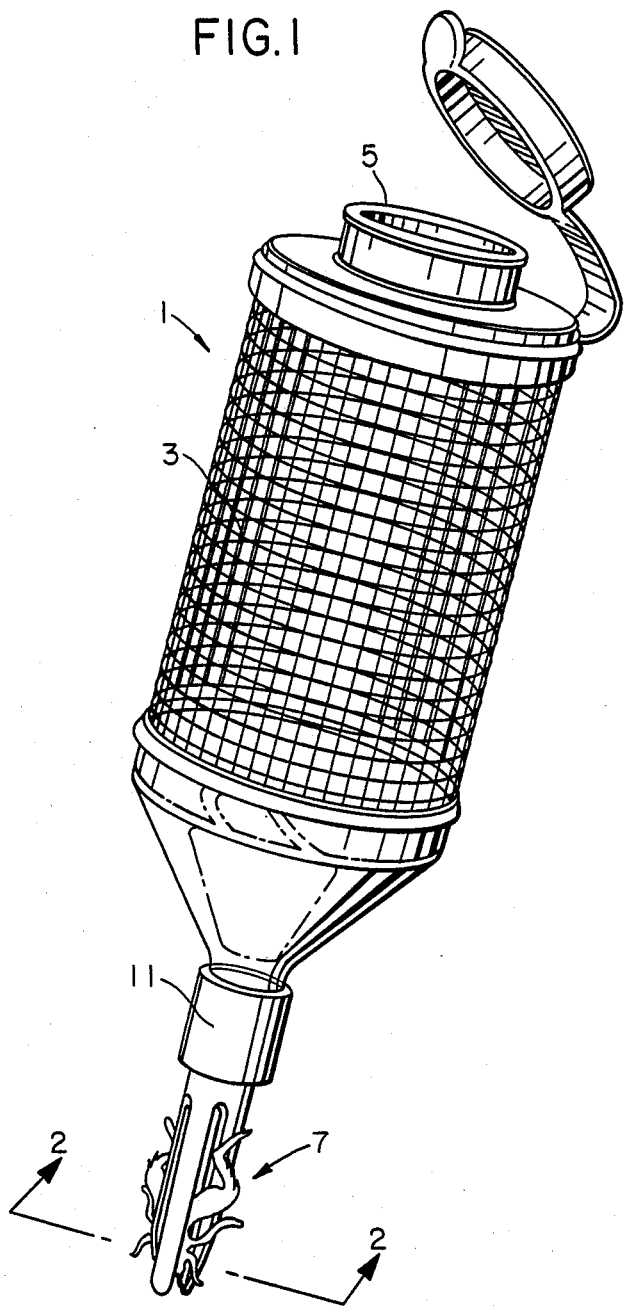
FIG. 1 of the drawings is a perspective view of a dispensing apparatus in accordance with this invention.
Figure 2:
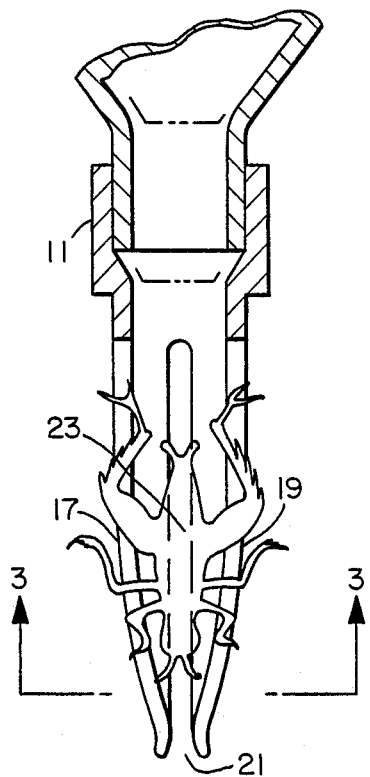
FIG. 2 of the drtawings is a cross-sectional view of a portion of the nozzle of FIG. 1 across the line 2—2.

FIG. 1 of the drawings illustrates a dispensing apparatus 1 having a source of crickets within a wire cage 3, an opening or loading end 5 and a dispensing nozzle 7.

Nozzle 7 has an annular open end 11 communicating with the source of crickets 3. Four (4) prongs, best seen in FIG. 3, 13, 15, 17 and 19 emanate from and connect with annular member 11. The four prongs, 13, 15, 17 and 19, converge continuously and define a restricted dispensing opening 21.

Figure 3:
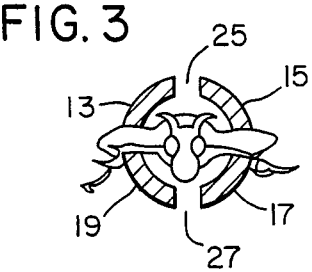
FIG. 3 of the drawings is a cross-sectional view across the line 3—3 of FIG. 2.

It has been found that by converging continuously to form a restricted opening, crickets such as that illustrated at 23 will position themselves within the nozzle. Due to the converging and openings therein, a cricket cannot reverse the movement. The cricket is thus trapped and displayed for impalement upon a hook. It is readily apparent that the hook may be passed between any of the spaces defined between adjacent prongs. As illustrated in FIG. 3, the space 25 may be used to place a hook therethrough and thus impale the cricket. In the process, the hook may pass through the directly opposite space 27 to permit removal of the cricket by pulling the hook and the cricket through the restricted opening 21. In this manner, it is readily apparent that no additional parts need to be moved so as to consume the use of one of the fisherman's hands.

The advantages of this configuration can be summarized as follows. The process of impaling the cricket is significantly less than the time otherwise required. The cricket is not lost in the process of placing one upon a hook. This cricket is not damaged or mashed in the process of being placed upon a hook. The fisherman never has to touch the cricket in the process of placing it on the hook. the cricket may be hooked in several different manners as it is held within the nozzle. Crickets enter the nozzle voluntarily but alternatively can be forced into the sleeve by turning the entire dispensing apparatus upside down and shaking. Once in the dispensing nozzle, the cricket cannot return to the original source of crickets. The prongs which form the sleeve while defining a continuous taper are resilient so as to accommodate various sizes of crickets but without sufficient flexibility to permit a cricket to escape.

It is preferred to slightly round the inside of the prongs at the opening 21, as illustrated in FIG. 1, so as to permit easy sliding of the cricket through the prongs without harming the cricket.

It is thus seen that the cricket dispensing nozzle of this invention provides many significant attributes. As various modifications will become apparent from a reading of the above description which is exemplary in nature, such modifications are embodied within the spirit and scope of this invention which is to be measured by the following appended claims.

That which is claimed:

1. A cricket dispensing nozzle, comprising:

a generally annular open end for communicating with a source of crickets;

four (4) resilient prongs emanating from said annular end and converging to form a restricted opening;

each of said prongs defining in conjunction with adjacent prongs a space therebetween to permit insertion of a fishing hook through a first space;

said prongs defining a continuous taper towards said restricted opening; and said prongs having a flexibility permitting a cricket to be pulled through said restricted opening without damage, preventing said cricket from crawling from said restricted opening.

2. The cricket dispensing nozzle according to claim 1 wherein said resilient prongs have a radius of curvature opposite that of said continuous taper at said restricted opening to facilitate dispensing a cricket therefrom.

3. A process for dispensing a cricket comprising the steps of:

providing a dispensing apparatus including:

a generally annular open end for communicating with a source of crickets;

four (4) resilient prongs emanating from said annular end and converging to form a restricted opening;

each of said prongs defining in conjunction with adjacent prongs a space therebetween to permit insertion of a fishing hook through a first space;

said prongs defining a continuous taper towards said restricted opening; and said prongs having a flexibility permitting said cricket to be pulled through said restricted opening without damage, preventing said cricket from crawling from said restricted opening;

positioning a cricket within the space defined between said resilient prongs;

immediately thereafter, passing a hook through said first space and into said cricket to impale said cricket; and pulling said cricket through said restricting opening to use same as fish bate.

* * * * *